United States Patent
Vähänen et al.

(10) Patent No.: US 10,688,525 B2
(45) Date of Patent: Jun. 23, 2020

(54) MATERIAL SPRAYING DEVICE AND A METHOD FOR CONTROLLING THE SPRAYING DIRECTION OF THE DEVICE

(71) Applicant: Tikkurila Oyj, Vantaa (FI)

(72) Inventors: Johannes Vähänen, Oulu (FI); Tapani Vähänen, Oulu (FI)

(73) Assignee: Tikkurila Oyj, Vantaa (FI)

( * ) Notice: Subject to any disclaimer, the term of this patent is extended or adjusted under 35 U.S.C. 154(b) by 0 days.

(21) Appl. No.: 15/326,701

(22) PCT Filed: Jul. 7, 2015

(86) PCT No.: PCT/FI2015/050492
§ 371 (c)(1),
(2) Date: Jan. 17, 2017

(87) PCT Pub. No.: WO2016/009112
PCT Pub. Date: Jan. 21, 2016

(65) Prior Publication Data
US 2017/0203318 A1    Jul. 20, 2017

(30) Foreign Application Priority Data
Jul. 17, 2014 (FI) ..................... 20145676

(51) Int. Cl.
*B05B 12/12* (2006.01)
*B05B 3/02* (2006.01)
(Continued)

(52) U.S. Cl.
CPC .............. *B05D 1/02* (2013.01); *B05B 12/124* (2013.01); *B05B 13/005* (2013.01);
(Continued)

(58) Field of Classification Search
CPC . B05B 12/124; B05B 12/126; B05B 13/0278; B05B 15/652; B05B 15/656;
(Continued)

(56) References Cited

U.S. PATENT DOCUMENTS 5,098,024 A *  3/1992  MacIntyre .......... B05B 13/0431
                                                        239/587.1
2009/0317554 A1* 12/2009 Christensen ........ B05B 13/0431
                                                        427/427.2
(Continued)

FOREIGN PATENT DOCUMENTS

DE  4033331 A1  4/1991
EP  0270408 A1  6/1988
(Continued)

OTHER PUBLICATIONS

European Patent Office, Supplementary European Search Report issued on EP15822311, dated Mar. 28, 2018.
(Continued)

*Primary Examiner* — Alexander M Weddle
(74) *Attorney, Agent, or Firm* — Berggren LLP

(57) ABSTRACT

The present invention introduces an operational end module for material spraying or working tool applications. The end module may be fixed in an arm. The end module senses its current location and alignment, together with its nearest distance to an obstacle. The system corrects the direction and location of the end module based on the sensed data and the used application. The device has a user input interface and a screen for parameter representation. The end module direction and location can be controlled by three mutually orthogonally aligned motors connected along the material pipe, where the pipe curves between the motors, together
(Continued)

with a variable length arm. A machined screwdriver operation in difficult locations is an example of the invention in the area of working tools.

20 Claims, 3 Drawing Sheets

(51) Int. Cl.
| | |
|---|---|
| *B05D 1/02* | (2006.01) |
| *B05B 15/652* | (2018.01) |
| *B05B 15/656* | (2018.01) |
| *B05B 15/70* | (2018.01) |
| *B25J 17/02* | (2006.01) |
| *B25J 13/08* | (2006.01) |
| *B25J 11/00* | (2006.01) |
| *B25J 13/06* | (2006.01) |
| *B25J 19/00* | (2006.01) |
| *B05B 13/00* | (2006.01) |
| *B05B 13/02* | (2006.01) |
| *B05B 13/04* | (2006.01) |

(52) U.S. Cl.
CPC ........ *B05B 13/0278* (2013.01); *B05B 15/652* (2018.02); *B05B 15/656* (2018.02); *B05B 15/70* (2018.02); *B25J 11/0075* (2013.01); *B25J 13/06* (2013.01); *B25J 13/088* (2013.01); *B25J 17/0283* (2013.01); *B25J 19/0029* (2013.01); *B05B 3/026* (2013.01); *B05B 13/0431* (2013.01)

(58) Field of Classification Search
CPC . B05B 15/70; B05B 3/026; B05D 1/02; B25J 11/0075; B25J 13/06; B25J 13/088; B25J 17/0283; B25J 19/0029

See application file for complete search history.

(56) References Cited

U.S. PATENT DOCUMENTS

| | | | |
|---|---|---|---|
| 2012/0145075 A1 | 6/2012 | Takahashi | |
| 2013/0257984 A1* | 10/2013 | Beier | B41J 2/135 347/37 |
| 2013/0296812 A1* | 11/2013 | Bangera | A61M 35/00 604/290 |
| 2013/0321656 A1 | 12/2013 | Ducharme et al. | |
| 2013/0330467 A1* | 12/2013 | Bond | E21D 11/10 427/8 |
| 2014/0259534 A1* | 9/2014 | Shields | B25G 1/04 16/429 |

FOREIGN PATENT DOCUMENTS

| | | |
|---|---|---|
| JP | 2004050356 A | 2/2004 |
| WO | 2005018813 A2 | 3/2005 |
| WO | 2011007200 A1 | 1/2011 |
| WO | 2012154718 A1 | 11/2012 |
| WO | 2013175392 A1 | 11/2013 |

OTHER PUBLICATIONS

Finnish Patent and Registration Office, Search Report dated Jan. 29, 2015 issued on FI20145676.

* cited by examiner

MATERIAL SPRAYING DEVICE AND A METHOD FOR CONTROLLING THE SPRAYING DIRECTION OF THE DEVICE

PRIORITY

This application is a U.S national application of PCT-application PCT/FI2015/050492 filed on Jul. 7, 2015 and claiming priority of Finnish National application FI20145676 filed on Jul. 17, 2014, the contents of all of which are incorporated herein by reference.

BACKGROUND OF THE INVENTION

Paint spray guns are common tools for painting walls, ceilings, objects or other kinds of surfaces which are large or difficult to approach directly. Paint spray tools usually have an arm or a handle whose length is fixed, and such an arm gives the option to reach more distant areas from the painter's point of view. A paint spray gun may include one or several nozzles which are normally arranged along a straight line arrangement. With a plurality of nozzles lined in orthogonal direction in relation to the movement direction of the spraying device, the user obtains wider painting area with a single brush.

Especially in painting walls, ceilings and roofs, there emerges a need to use longer arms or tools in order to reach the surfaces to be painted which locate farther from the painter him/herself. The longer the distance between the paint spray gun user and the surface to be painted, the bigger possibility for non-accuracy in the painting process emerges.

In prior art, the paint spray guns with longer arms use a fixed structure where the arm and the paint nozzles locate in a fixed mutual angle. Such a construction of the spray gun with a longer arm results in that when painting e.g. a higher wall along a vertical movement of the spray gun, the paint output direction from the nozzles is different in the lower part of the wall compared to the higher part of the wall. Even a variable length arm, where the arm length could be changed by a motor, would easily result in a changing paint output direction towards the surface to be painted, and therefore the painting quality could easily get worse.

In some solutions, the nozzle direction could be mechanically or manually changed by rotating the nozzle around a joint, with the nozzle achieving a new angle in relation to the arm supporting the nozzle. The manual and mechanical adjustment is pretty inefficient, and requires a lot of manual work besides the actual painting process which also takes time. The turning joint also has a deficiency that only certain angle values are possible because the joint must enable the flow of the liquid through itself as well.

In prior art, a painting robot for painting cars automatically in the end of their manufacturing process, is an example where a robot arm provides the spraying function. A relevant characteristic in these applications is that their movements i.e. the painting arm paths need to be well defined and pre-adjusted before the actual painting process. The system would not work without preinstalled routes in the controller of the painting robot for the vehicles.

Concerning other technology areas, in camera technology and especially their alignment tools in machine- or manually directed photographing systems, there has been introduced a camera gimbal system. Such a gimbal with its controller is shown e.g. in US 2013/0321656. The camera gimbal controller includes motion sensors, such as a digital gyroscope, an accelerometer and magnetometers. All these sensors detect movements in three dimensions and their data is fed to a microcontroller. All the sensor data provides an accurate estimate of the current position and movement of the gimbal. The gimbal controller may provide the movement (panning, tilting and rolling) commands to the camera after the user has e.g. moved a personal smart phone as a joystick in order to give camera directions through movement of the phone (through a special application). The camera itself is attached to an arm structure which includes several joints. These joints allow rotating or turning around one, two or three axes in order to enable movement and rotation freely in 3-dimensional environment.

There is a need to introduce an intelligent paint spraying device whose paint output angle towards the painted surface is controlled in a clever manner in various different circumstances.

SUMMARY OF THE INVENTION

The present invention introduces a device configurable to spray material. The device comprises at least one nozzle in a spraying end module for outputting the material, and an arm supporting the spraying end module, at least two different sensors for detecting location and/or alignment and/or movement status of the spraying end module, wherein the at least two different sensors are selected from a group of a gyroscope, an accelerometer and a magnetometer, and means for detecting a distance to a nearby physical object or surface, a user interface for inserting user input commands for using the spraying device, processing means within the device or accessible from the device which processing means is configured to calculate a correction to the location and/or angle of the spraying end module based on at least one of the sensor data, the distance data and the user input commands, and means to adjust a length of the arm and/or the location and/or the angle of the spraying end module according to the calculated correction, in order to spray out the material from a desired distance and angle in relation to the physical object or the surface.

In an embodiment of the invention, the device comprises a laser, ultrasound or an RF signal transceiver as means for detecting the distance.

In an embodiment of the invention, the device comprises an internal controller and a memory unit for saving the sensor and detection data and as the processing means.

In an embodiment of the invention, the device is connected to a remote computer or server.

In an embodiment of the invention, the user interface comprises a handle and/or plurality of designated or programmable buttons and/or a joystick and/or a screen.

In an embodiment of the invention, the means for adjusting the location and the angle of the spraying end module is implemented with three cylindrical motors, the motors rotating around X, Y and Z axes, with the material input fed concentrically through the middle of the motors, where the motors are connected together with curved pipes.

In an embodiment of the invention, the control and sensor signals between the controller and the spraying end module are implemented with wirings placed in a dedicated space between the cylindrical motor and a material pipe.

In an embodiment of the invention, the device comprises a reserve tank of the sprayable material for its portable and small-scale use, and a main supply of the sprayable material connectable to the device input for its large-scale use.

In another aspect of the invention, a remotely controllable working tool is introduced. The working tool comprises a fixed or changeable working tool module to be operable on a surface or towards a counterpart element, and an arm supporting the working tool module, at least two different sensors for detecting location and/or alignment of the working tool module, wherein the at least two different sensors are selected from a group of a gyroscope, an accelerometer and a magnetometer, and means for detecting a distance to a nearby physical object, a user input interface for inserting user commands for using the working tool, processing means configured to calculate a correction to the location and/or angle of the working tool module based on at least one of sensor data, distance data and user commands, and means to adjust the length of the arm and/or the location and/or the angle of the working tool module according to the calculated correction, in order to make contact and operate the surface or the counterpart element with the working tool.

In yet another aspect of the invention, a method for controlling a spraying device or a working tool is introduced. The method comprises the steps of:

sensing at least one of movement status, alignment and location of a spraying end module or a working tool module by at least two different sensors, which are selected from a group of a gyroscope, an accelerometer and a magnetometer, detecting a distance to a nearby physical object or surface, receiving user input commands, calculating a correction to the location and/or angle of the spraying end module or the working tool based on at least one of the sensed data, the detected distance data and the user input commands, and adjusting the location and/or the angle of the spraying end module according to the calculated correction, in order to spray out material from a desired distance and angle in relation to the physical object or the surface, or in order to make contact and operate the surface or a counterpart element with the working tool.

DETAILED DESCRIPTION OF THE INVENTION

The present invention introduces a paint spray gun or a liquid-based material spraying device which has an advanced controlling method for movements and alignments of the spraying end of the paint spraying device. This is a first aspect of the invention.

A second aspect of the invention is a pressurized washing device using an arm structure and water (or other cleaning liquid) in order to direct high-pressure water or other liquid material spray onto a material to be cleaned or washed.

A third aspect of the invention is a working tool which may have an arm and a working tool module, like a remotely controllable machine-directed screwdriver. In this aspect it is essential to get a physical contact between the tool module and the counterpart element which the tool is affecting.

Figure 1A:
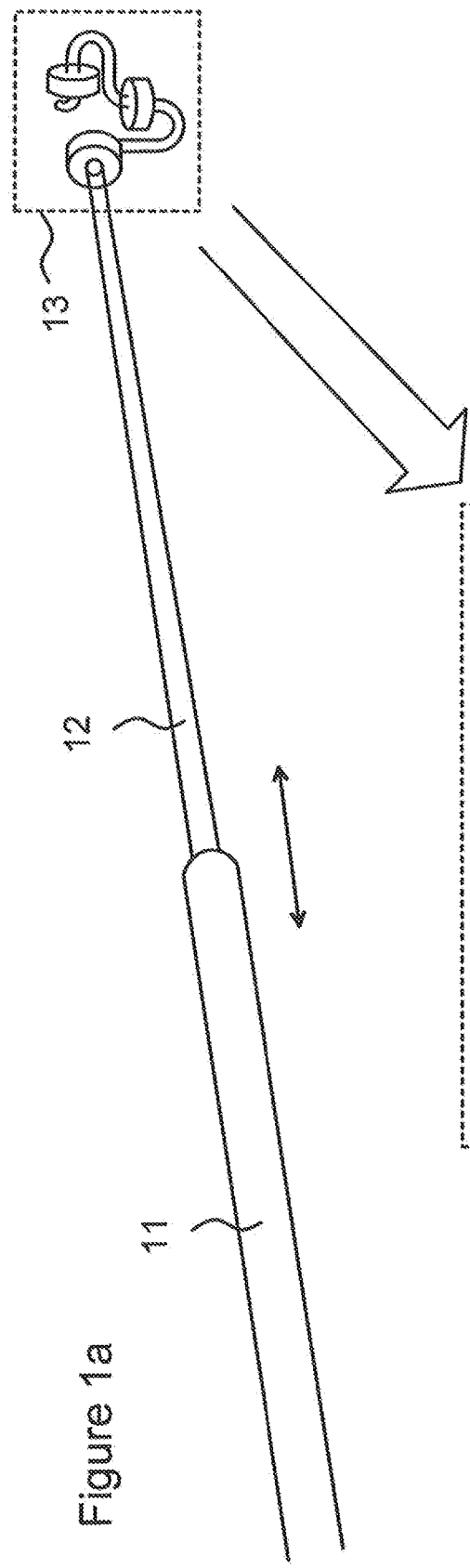
FIG. 1a shows the general structure of the paint spraying device according to the invention.

FIG. 1a shows the paint spraying device with the focus on the arm structure and generally showing the spraying end. The arm 11, 12 carries the paint or water or other material inside it. The arm 11, 12 may include sections which are retractable. In FIG. 1a, there is shown an example where a second arm section 12 is located inside a first arm section 11, and the second arm section 12 may be pulled out from the first arm section 11 until the second arm section 12 reaches the outermost position as shown in FIG. 1a. The arm sections will remain connected together, and after pulling the second arm section 12 out from the first arm section 11, the sections may in one embodiment be mutually locked in order to set the structure as fixed during the painting. In another embodiment which is more applicable to painting surfaces in variable distances from the user, the length of the second arm section 12 can be controlled intelligently depending on the measurement results made by the sensors in the spraying end module and also depending on the user commands which can be given through control buttons or levers. These are discussed later in more detail.

It is possible to create the arm structure as a single straight or curved arm. Also it is possible to construct the arm from three or even greater number of arm sections which can be retracted. The structure may be straight as a whole or it can bend or be angled in certain sections of the whole arm depending on the requirements of the application area of the device.

The arm length as a whole can be varied and controlled by the user and also by the controller of the device through the sensor information (explained later in more detail). Therefore the distance from the spraying nozzle to the surface to be painted (or washed) can be selected and maintained in different heights with the help of retractable and controllable arm sections.

Figure 1B:
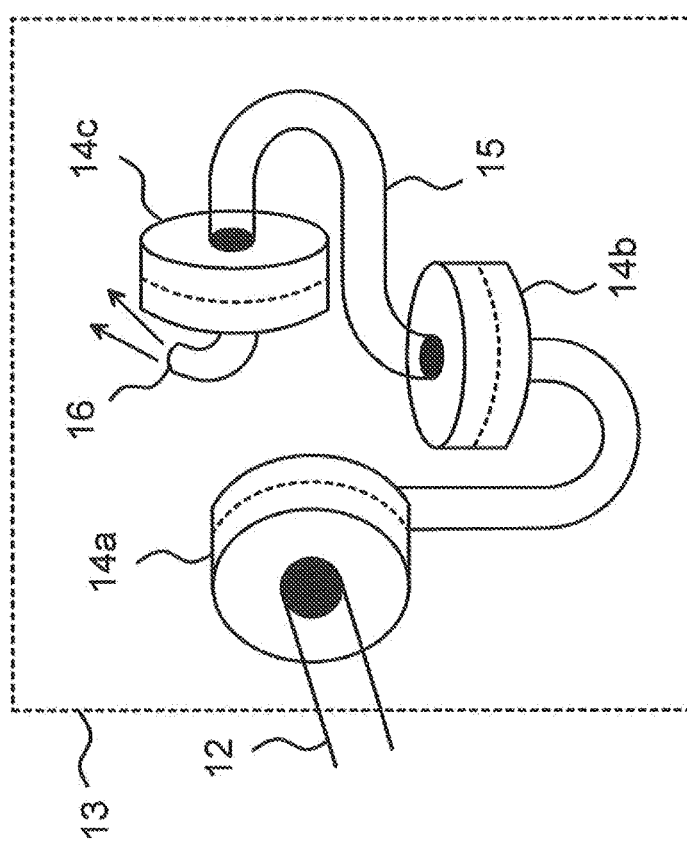
FIG. 1b shows the spraying end of the device in more detail, enabling a tunable spraying direction for the sprayed material.

FIG. 1b shows in more detail the spraying end module 13 which is connected to the free end of the second arm section 12 (in figure, the right end). The spraying end module 13 is designed as a curved structure comprising at least one joint and at least one motor 14a, 14b, 14c. In one embodiment, the spraying end module 13 comprises three separate motors 14a-c, which each enable rotation of the pipe around a corresponding middle axis. Each of these axes is placed perpendicular to each other so that the three rotation axes of the motors cover all the 3-dimensional directions, that is, the X, Y and Z directions.

The pipe 15 carrying the material to be sprayed goes through each of the motors 14a-c. The pipe 15 is curved between the joints so that in the non-deviated position of the device, the motor axes all have a mutual 90° angle between them. In this position, the spray output angle is preferably the same as the angle of the second arm section 12. When at least one of the motors has deviated a pipe section around a joint through a rotating movement, the outburst direction of the end of the pipe 16 changes. By using the selected motors and selecting their corresponding rotation angles, the outburst angle can be almost anything in a sphere coordinate system. In practice, the desired spraying output direction space can lay along a half sphere locating outwards from the plane surface which is orthogonal to the longitudinal axis of the second arm section 12.

In another embodiment, unlike the curved form of the pipe starting from the first motor 14a and ending in the spray output of the pipe 16, it is possible to manufacture the pipe from direct pipe segments where the motor axes still fulfill the same angle condition as in the above examples. Preferably, the angles between such pipe segments are obtuse, and the length of the segments small, in order to ensure proper flow for the material inside the pipe 15.

In yet another embodiment of the spraying end module, the motors and pipe segments can be replaced by a single spherical joint which can be controlled by a single motor. With such a ball joint, the spray output direction can be freely selected. In practice, the applicable direction space is the half sphere around the joint pointing outwards from the arm.

Furthermore, e.g. in the outermost end of the tubular pipe or fixed on the outer edge of the pipe output 16, at least two different sensors for detecting the movement, location and/or alignment data, as well as detecting means capable of sensing the proximity to a physical external object, are mounted. These sensors are selected from a group of gyroscope, accelerometer and magnetometer, and furthermore, a laser, ultrasound or other kind of an RF signal or pulse transceiver may be provided as a proximity detector utilizing a transmission, reflection and reception together with processing the signal propagation time and resulting in the distance between the barrier and the section 16 of the device. The sensors are discussed next in more detail.

In other words, in one embodiment of the invention regarding the apparatus applicable to the spraying device, the spraying end module comprises at least two different sensors for detecting movement, location and angle of the spraying end module. In an embodiment, there are three different sensors fixed to the spraying end module. These sensors are an accelerometer for sensing the acceleration of the spraying end module, a gyroscope for measuring orientation and a magnetometer to be used as a compass (achieving the direction to the magnetic north pole).

In one embodiment of the device, only the accelerometer and the gyroscope are used as sensors fixed to the spraying end module.

In an embodiment of the invention, the spraying end module is provided with a means for sensing its distance from the closest surface. Usually this surface is the wall, ceiling, roof or other surface which is painted or washed with a spraying material (such as a cleaning liquid substance or water, for instance). In a working tool embodiment discussed later, the means for sensing the distance between a tool head and its corresponding counterpart can measure the distance in helping the controller to direct the tool head smoothly into contact with the counterpart or the surface or component to be treated.

The means for sensing the distance can be implemented with a laser transmission and reception measurement or with an ultrasound transmission and reception, both reflecting from the surface. By measuring the signal transmission time t, the closest distance to the surface d can be calculated from:

$$d = \tfrac{1}{2} t v_s, \quad (1)$$

where $v_s$ is the velocity of the transmitted signal.

In a further embodiment of the distance sensing means, there can be placed two transceivers in a short mutual distance from each other in the spraying end module. By measuring the distances to the nearest surface with two parallel transceivers, the two distances can be measured and thus kept the same, and the device may be kept well aligned in comparison to the surface to be painted. Especially with curved or round-shaped objects and sections of walls or other surfaces, the painting of these is handled with much more precision.

Figure 2B:
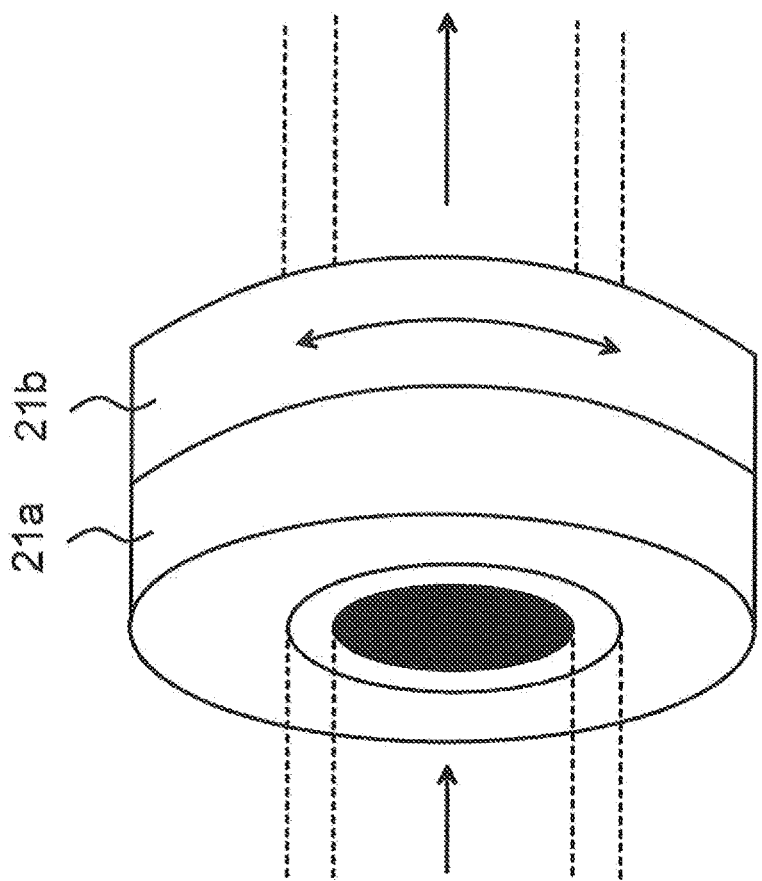
FIG. 2b illustrates the cross section of FIG. 2a from a different angle.
Figure 2A:
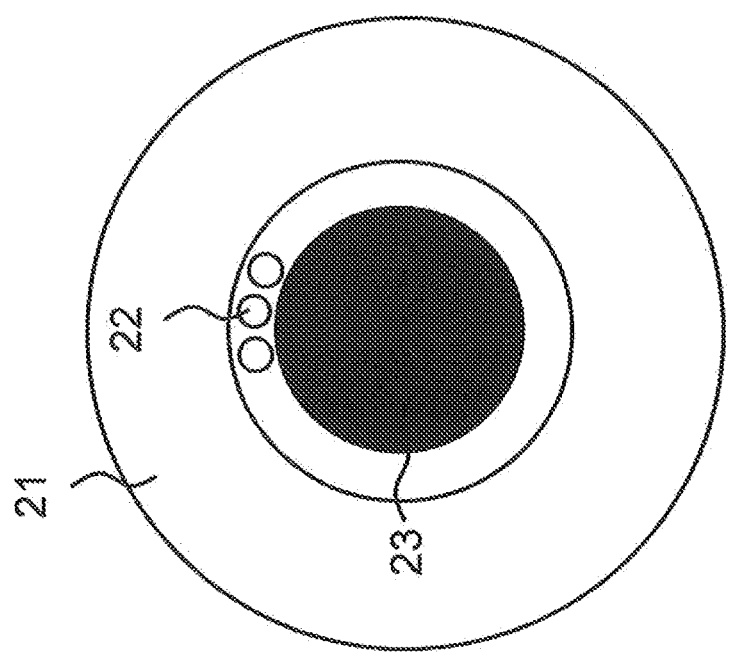
FIG. 2a illustrates a cross section of a joint module comprising a motor, electrical wirings and the pipe carrying the sprayed material.

FIGS. 2a and 2b illustrate a cross-section of a single cylindrically shaped motor from two different points of view. The motor 21, electrical wirings 22 and the tubular pipe 23 carrying paint, water or other sprayable material locate concentrically around the same rotation axis of the motor in this embodiment, as shown in FIG. 2a. As it is illustrated in FIG. 2b from another direction, the motor 21 may comprise two consequent motor sections 21a, 21b. The motor force transmission is arranged so that a second motor section 21b is rotatable in relation to a first motor section 21a, and the first motor section 21a remains fixed to the pipe attached to the motor 21 from the left hand side. The material flows in this arrangement from left to right in the pipe 23 (across the black area in the Figures). The electrical wirings provide the electric supply to all the motors and the control signal for activating each motor in a desired way. The wirings also enable directing the measured sensor data back to the controller.

In another embodiment of the invention, the pipe carrying the fluid may be an external pipe in relation to the arm and the wirings feeding the end module of the device. For instance, the liquid can be fed by a flexible rubber hose which is connected to an arm or a similar support structure which carries the actual end module for directing the fluid out on a desired target surface or place.

In an embodiment of the spraying device and its physical construction, the device includes a user operable handle which is also used for gripping the device itself. The handle may comprise several functionalities such as "a dead man's switch" (a button or the handle itself which must be pressed in order to keep the device switched on), initiating a forced starting or instant stopping of the paint or water flow or any other material to be sprayed (the latter for safety in emergency situations) and a feature for sensing and locking a reference angle between the spraying nozzle and the surface to be painted, washed or operated. Further possible options for the handle or for a specific button near or on the handle are defining the starting location of the overall painting process where an optimal painting angle can be defined and installed on the nozzle. When moving the painting device across the surface, the device may be set to continuously use the optimal painting angle towards the surface to be painted. Yet another option of a specific operation of the handle or a button is to stiffen the painting arm and the end module in order to transform the device into a conventional high pressure spraying device with a fixed nozzle output angle. With yet another signaling with (pressing of) this button, the stiffened device can be released to be used again with an intelligently varying painting device head.

Concerning the reference angle locking feature and the painting angle selection in general, we discuss these issues here in more detail. When painting e.g. a high vertical wall between the floor level and the ceiling level, the painter using a fixed or variable length spraying arm will need to adjust the length of the arm and also the nozzle angle towards the surface to be painted, if the painting angle is required to remain at least sufficiently constant for all height levels of the wall. Normally there exists a minimum threshold angle which should be exceeded at all times in order to ensure proper paint adhesion and painting quality. The spraying angles directed towards the surface at about 90 degrees (orthogonally or close to it) usually give the best results. The user may prefer finding a proper painting angle and after verifying the results e.g. visually, the painter can give a command to the spraying device to input a painting angle to the device and to maintain it throughout the painting process.

When the painter using the spraying device approaches any kind of discontinuation, barrier or step on the painted surface, like the edge between the wall and the ceiling surfaces of a room, the painter may give an angle locking signal by pressing the handle of the device or a dedicated button in the user interface of the device. After the angle has been registered, and saved in the memory unit, the user may move the spraying device nozzles to the new location where the new painting process is desired to be started. Typically this kind of a situation emerges when the wall has been painted with a certain nozzle angle, and the user wants to shift the work to the ceiling. When the output nozzle is moved to the desired starting location near the ceiling, the user may press the dedicated button or handle again, and thereafter, the device with the help of the controller's intelligence, will sense the current nozzle angle and change the angle to the earlier saved painting angle. When the angle change has been completed for the nozzle, the controller will initiate and restart the paint outflow.

In all the embodiments, paint can be replaced with water, other liquid, or liquid-based material (such as a gel, or a liquid solution comprising solid particles) which is capable of flowing and to be sprayed on any desired place or surface, or just outwards from the nozzle working as the end module output. Such a place where the sprayed material is directed to, may thus also be air or even a vacuum, like the way a fountain works. The liquid material to be sprayed could even be replaced by some solid material, e.g. like small rocks, crushed gravel or sand used in a sanding machine in freezing or other circumstances where friction to the ground needs to be increased. Another possible example of a solid material to be sprayed is a snow making machine used in downhill skiing centers, or a tennis ball cannon used for consistent ball hitting during a tennis practice session.

In yet another possible option, the device may be configured to spray gaseous materials, such as e.g. air, from its nozzles.

In a practical embodiment regarding manual controlling of the placement and alignment (angle) of the spraying nozzle when painting or washing, the spraying device can be provided with a joystick locating within easy access for the device user while the device is in use. The joystick can be used for direct manual changing of the spraying end nozzle location and/or output angle. The joystick may be given a priority in the controller's logic in a way that the user input through the joystick forces the spraying direction to change accordingly and instantly regardless of the sensing results of the sensors.

In an embodiment of the apparatus, a centralized controller unit handles gathering of the sensor information, required calculations, handling user input signals, and giving commands to the motors through the wirings inside the arm structure. The controller unit may be physically located near the handle of the spraying device. A different way of implementing the controller is using a wireless transceiver in the spraying device, and operating the spraying device externally through a remotely located computer. In such an embodiment, the microprocessor of the computer or server works as a controller as mentioned in the above.

With an external computer which performs calculations and commands to the spraying device, it is possible for control the painting or washing process from a suitable interior like inside the building whose ceiling is being treated on the outside, or from a vehicle used by the service provider which may be parked in a close vicinity of the treated surface.

As a useful tool for any user handling or operating the spraying device in practice, the device itself may be provided with a screen capable of showing various apparatus information, sensor data, or any other kind of application data to the user or the operator of the spraying device. The information may include device status information and alarm data as well. The screen can be attached in close proximity to the operator's handle of the device. Another option for showing the application or device parameters to the user is to present the information on the screen of the remotely locating computer or server. In one embodiment of the invention, the screen may be used as a user input interface as well through touch screen functionalities.

The device naturally requires electrical supply power in some form. This may be achieved through a battery or set of batteries fixed to an appropriate battery holding space of the device or through mains current input onto which the spraying device is connected. When the mains current is connected to the device, the less than fully charged battery can then be loaded simultaneously.

Similarly as the electrical supply, the device needs a main material input bus like a paint input pipe connected with a sufficiently large paint storage volume, or a water pipe together with a connection to a water tank or water supply. For situations where the main material input flow needs to be interrupted for some reason, like in an especially tight area where the painting is performed, there can be provided a smaller reserve material tank connected to the spraying device. This can be also called as an intermediate tank. When there is any need to cut the connection to the main input pipe coming from the paint or water storage, the reserve tank will be switched on, and the most difficult spaces, for instance, could be painted without any restrictive input hoses or pipes connected to the spraying device. The system can be provided with a compressor which provides a needed pressure level when the battery supply is used as the input power. In one embodiment, the reserve material tank may have a volume between 1 litre to 10 litres, and it can be fixed directly to the device near its gripping part. Another exemplary option is to set the reserve material tank and the compressor in a backpack which is carried by the user of the device.

The invention is generally suitable for various liquid transport systems where the location and the angular direction of the transport system's output is required to be tracked or directed for any reason. Another possible application area is to use the invention with a specific tool, e.g. with a machine-directed screwdriver or in other kinds of utensils or instruments which may have a specifically shaped arm or head for grabbing or processing any material or object. The screwdriver application is a useful one because the exact placement of the tool's head and also the alignment direction onto the screw is essential for the tool to be successfully used. Also the locations and the face directions can be tricky regarding the accessibility to the site itself. The present invention allows any tool with a controllable processing or grabbing head to be used remotely with or without a specific arm, giving access to places not otherwise easily accessible to be worked with. With the present invention, working tools may be used successfully without extensive cranes or support structures required on the scene.

Figure 3:
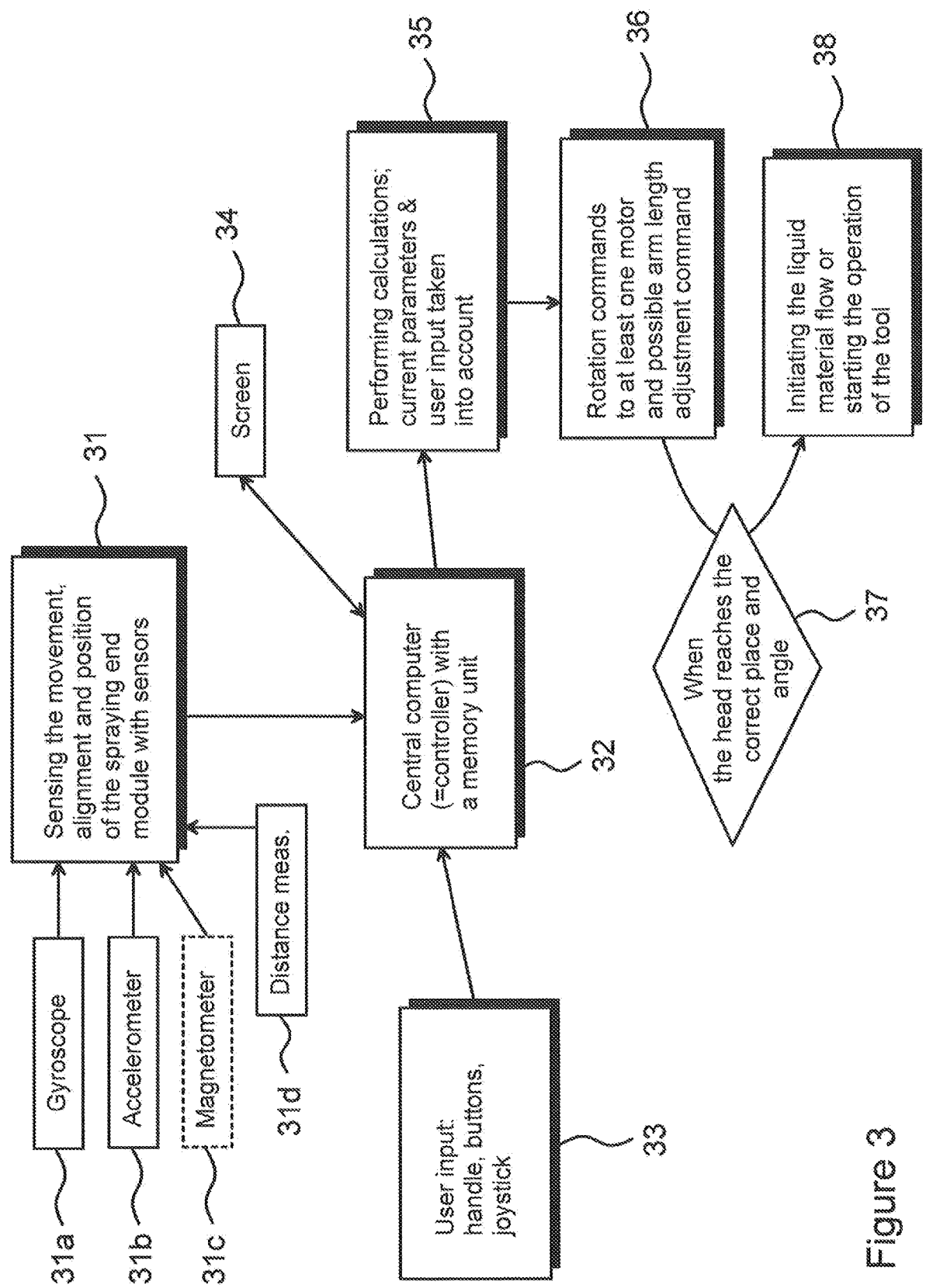
FIG. 3 illustrates a controlling method of the spraying device or a working tool in a flow chart form.

FIG. 3 illustrates the process of intelligent controlling of the paint spraying device, a pressure washer, a liquid transport system or a working tool head. At first, the sensors 31a-c fixed or connected on the spraying end module measure a current position (absolute coordinates), its alignment data (nozzle head angle) and movement (speed and/or acceleration of the spraying end module). The exemplary sensors to be used are a gyroscope 31a for measuring orientation of the end module, an accelerometer 31b for measuring its acceleration (and using the equations a=$\Delta v/\Delta t$ and v=Δs/Δt; achieving the movement data along three different axes), and if desired, a magnetometer 31c to be used as a compass. A distance measuring means 31d detecting the distance to the closest physical obstacle, object or surface is an essential measurement. This may be implemented with e.g. a laser or ultrasound transmission and reflection measurement. All sensed and measured information can be saved to the memory unit and thus fed to the calculation logic of the system, i.e. a central computer 32 (or a controller, or other kind of data processing unit). User input commands 33 are given with specific means available manually to the user and the user input signals are fed to the controller 32 as well.

The central computer or controller 32 will then calculate magnitude and direction of a required correction to the current location and angle of the device's end module (or head). In case there is no need for correcting the end module location or alignment, e.g. if the user has pushed "a forced painting mode" button through user input interface 33, the condition 37 is fulfilled already and the liquid material flow (or the operation of a tool) can be initiated instantly 38.

Otherwise, the calculation unit 32 will calculate a required change or compensation 35 needed for the end module location and its angle. The sensor data achieved from the sensors 31a-31d may be fed to a Kalman filter which can handle non-idealities in the form of noise in the sensor data, and also recursively takes the previous sensor results into analysis when estimating the following state (location and angle) of the system. Different sensors can be weighed with various and selectable coefficients in the calculations. The calculation algorithms for the absolute location, angle and distance to the closest object can be implemented as a single software block or by several separate computer program code scripts available in the memory unit and executed by the controller. When the compensation results are ready, this information is triggered into commands 36 for the motors (three motors like in the case of the device as in FIGS. 1a-1b) or for a single motor (in case a spherical joint with a motor is used). The command signals can be fed simultaneously to the motors, and the motor rotation movements can be simultaneously triggered for quick realization of the end module correction. The arm length can be adjusted as well if the joints between the arm sections are motorized.

If desired, the system may rely on single calculation round 35 during correcting the position and alignment of the end module. Still, in another embodiment, it is possible to re-measure the new apparatus environment with at least two different sensors 31a-d after making a correction movement through rotation by at least one motor. The newly sensed information may be used in refining the correction magnitude (for both the position and the angle) and therefore, the correction can be made even better regarding the achieved accuracy.

The condition 37 regarding reaching the correct location and achieving the correct angle (also, a correct and desired angle towards the closest surface) is fulfilled when the rotation orders have been implemented and each motor has concluded its movement.

The operation of the motors can be selected wisely so that in case of extremely narrow spaces to be reached, the motors can be operated sequentially in a way where no collision happens with an obstacle. It may be beneficial to e.g. first operate the arm length motor with a protruding movement (increasing the arm length) and after that, to progress with the three motors capable of finding the right angle towards the painted surface.

When the correction movement has been finished, the data processing unit 32 will in one embodiment trigger the initialization 38 of the fluid transport towards the end module and out towards the surface where the effect of the liquid is desired. Regarding the tool operation embodiment, this step will initiate the operation like starting the rotation of the screwdriver head in a desired rotation direction. In another embodiment, the initiation of the liquid flow or the rotation of the tool head can be done manually (e.g. through a switch pressable by the user). In the latter case, also the stopping of the liquid flow or the rotation of the tool can be performed manually (e.g. by releasing the switch).

Generally the present invention is useful for correcting any movement error or vibration or mistakes in painting or washing processes. A second benefit is that during painting larger surfaces like high and large wall surfaces, the prior art solution like painting devices with a fixed-angle nozzle will result in varying arrival angles for the paint or water in relation to the affected surface. With the present invention with an intelligent location and angle tuning system for the end module (the painting head), the arrival angle of the paint towards the surface can be selected and tuned intelligently. This enhances the paint adhesion and the overall quality of the painting dramatically. Regarding any tool head operation remotely with the principles of the invention, much easier access to the operated location may be achieved without specific cranes or support structures which would have to otherwise be built for the tool operator him/herself. A further benefit in the invention is that with the help of the closest distance measurement sensor, it is easy to detect upcoming barriers and non-continuous sections in the surface to be painted. When e.g. a mechanical obstacle is closing in the painting device head, the system may even give a warning of such an obstacle and/or also tune the painting angle or stop the painting in order to e.g. avoid the obstacle to be painted. A further advantage is the possibility to make the device more portable and movable in smaller spaces, when the local battery is used as the power supply and the smaller reserve paint or water tank is locally taken into use.

A further option for the invention is to use it with industrial robots, like on a production line of a factory with automatically operated arms. The intelligent sensing and movement control of the device head module is directly applicable to situations where industrial robots are used in manufacturing of the devices, like in assembling and painting new cars.

A yet further option for the paint nozzle head is to feed differently coloured paints to the nozzle head with several parallel hoses or pipes. The nozzle head may be formed to allow selecting a single colour output or combining desired colours through instructions given by the operator, e.g. the painter himself or the user having access to a remote computer. Such a device head feature is pretty much comparable to drink dispensing pistols which are commonly used in bars and restaurants. This feature allows a selection and even mixture of desired paint(s) by either the painter himself or the operator locating remotely to the device.

The paint output can naturally be created from a plurality of nozzles which may be located on a direct line or in a desired curved formation (like a circle). With a directly placed group of nozzles and when directing the painting head in orthogonal direction compared to the nozzle line direction, it is possible to achieve a wide painting area within a single brushing movement. Concerning the painting pattern width of a single nozzle in a given surface distance, the mutual distance between two consecutive nozzles can be selected appropriately in order to achieve a uniform paint area without too much overlapping sections between two adjacent nozzles. This kind of nozzle configuration of course makes the painting process much more rapid, especially for large surfaces to be painted. Pedestrian crossings on the roads form one suitable application area with this kind of painting device arrangement. In one embodiment of the invention, three, four or five adjacent nozzles is a practical number of linearly placed nozzles in the painting end module but of course, depending on the application, some other number of nozzles may be used to achieve a desired painting pattern.

The invention claimed is:

1. An apparatus containing a spraying device, the apparatus comprising:
   an end module comprising at least one nozzle for spraying a material toward a surface, wherein an angle orientation of the at least one nozzle is adjustable;
   a plurality of sensors configured to provide sensor data comprising at least the angle orientation of the at least one nozzle, where the spraying device comprises at least the end module and the plurality of sensors; and
   a controller, configured to a) receive the sensor data from the plurality of sensors and user commands manually provided by a user through a user interface, b) perform calculations of control signals using the received sensor data and the user commands, and c) provide the control signals to corresponding motors or actuators of the spraying device at least for adjusting the angle orientation of the at least one nozzle in order to maintain an arrival angle of the sprayed material to the surface within a predefined range,
   wherein the end module comprises three cylindrical motors rotating around X, Y and Z axes at least for adjusting the location and the angle orientations of the at least one nozzle, where the motors are connected together with curved pipes located in a middle of each motor, wherein the spraying material is fed through the curved pipes to the at least one nozzle.

2. The apparatus of claim 1, wherein the apparatus comprises the user interface, the controller and a memory, the controller being implemented as a processor or a part of a computing device.

3. The apparatus of claim 1, wherein the plurality of sensors comprises at least a gyroscope and an accelerometer.

4. The apparatus of claim 1, wherein the user interface comprises one or more of: a handle, a plurality of designated or programmable buttons, a joystick and a screen.

5. The apparatus of claim 1, wherein the control signals and the sensor data between the controller and the end module are provided using implemented with wirings placed in a dedicated space between the cylindrical motor and a material pipe.

6. The apparatus of claim 1, wherein the apparatus comprises a reserve tank of the sprayable-material for a portable use of the apparatus, and a main supply of the sprayable material, the main supply having a larger capacity than the reserve tank.

7. The apparatus of claim 1, further comprising at least one arm supporting the end module, wherein one of the control signals comprises instructions for adjusting a length of the at least one arm.

8. The apparatus of claim 1, wherein the spraying material is a liquid paint.

9. The apparatus of claim 1, wherein the at least one nozzle comprises a plurality of parallel nozzles for achieving a wide painting area within a single brushing movement.

10. The apparatus of claim 1, wherein the arrival angle exceeds a minimum threshold for the arrival angle at all times when spraying or painting differently oriented surfaces.

11. The apparatus of claim 1, wherein
   the sensor data comprises of a distance of the at least one nozzle to the surface; and
   the controller is configured to provide a corresponding control signal of the control signals in response to the sensor data comprising the distance of the at least one nozzle to the surface for providing a desired distance of the at least one nozzle to the surface.

12. The apparatus of claim 11, wherein the plurality of sensors comprises a laser, an ultrasound or an RF signal transceiver as means for detecting the distance.

13. The apparatus of claim 7, wherein any of the predefined range of the arrival angle and the desired distance is provided in one or more of the user commands signals through the user interface or being pre-stored parameters.

14. The apparatus of claim 1, wherein the arrival angle of the sprayed material is about 90°.

15. The apparatus of claim 1, wherein the user interface comprises one or more handles and a plurality of buttons to be used by the user to perform one or more of:
   setting the at least one nozzle with a desired angle orientation;
   switching the apparatus between a manual operation and an automatic operation using the controller;
   starting and stopping spraying the material; and
   converting the apparatus to a conventional spraying mode of operation with a fixed nozzle angle orientation of the at least one nozzle.

16. The apparatus of claim 1, wherein the apparatus comprises at least one transceiver for communicating with the user interface, located remotely to the apparatus, the controller being implemented as a processor or being a part of a computing device.

17. The apparatus of claim 1, wherein the plurality of sensors are configured to provide the sensor data which comprises a movement status of the end module.

18. The apparatus of claim 1, wherein the surface comprises at least one of a wall, a roof and a ceiling.

19. An apparatus containing a spraying device, the apparatus comprising:
   an end module comprising at least one nozzle for spraying a material toward a surface, wherein an angle orientation of the at least one nozzle is adjustable;
   a plurality of sensors configured to provide sensor data comprising at least the angle orientation of the at least one nozzle, where the spraying device comprises at least the end module and the plurality of sensors; and
   a controller, configured to a) receive the sensor data from the plurality of sensors and user commands manually provided by a user through a user interface, b) perform calculations of control signals using the received sensor data and the user commands, and c) provide the control signals to corresponding motors or actuators of the spraying device at least for adjusting the angle orientation of the at least one nozzle in order to maintain an arrival angle of the sprayed material to the surface within a predefined range,
   wherein the end module comprises two or more motors rotating around corresponding axes for adjusting at least the angle orientation of the at least one nozzle in order to maintain the arrival angle of the sprayed material to the surface within the predefined range, and wherein the plurality of sensors comprises at least two transceivers placed next to each other in the end module and configured to measure two corresponding distances nearest to the surface from the two transceivers respectively, so that the controller is configured to maintain the measured two corresponding distances being equal when moving the apparatus during spraying across the surface, thus maintaining the arrival angle of the sprayed material from the at least one nozzle to be in the predefined range in order to provide more precise spraying quality for curved and non-flat sections of the surface.

20. The apparatus of claim 19, wherein the spraying device comprises at least one transceiver for communicating with the controller and the user interface, the controller and the user interface being located remotely to the spraying device, the controller being implemented as a processor or being a part of a computing device.

* * * * *